INVENTOR
Jacques PONTBRIAND

ATTORNEY

July 7, 1970 J. PONTBRIAND 3,519,287
TRAILER STABILIZER
Filed Dec. 23, 1968 2 Sheets-Sheet 2
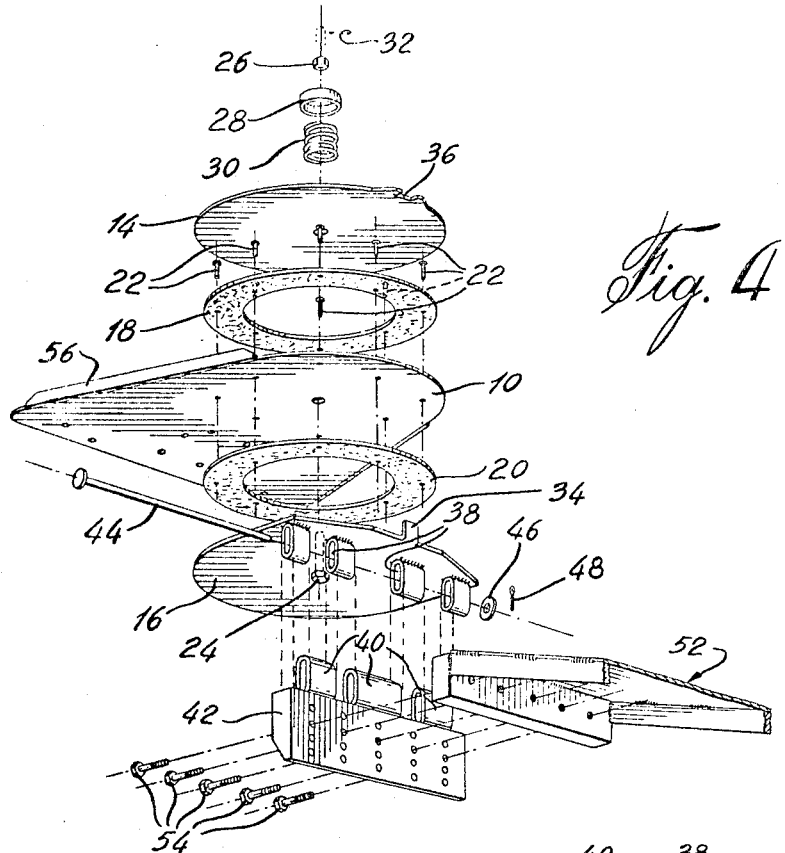
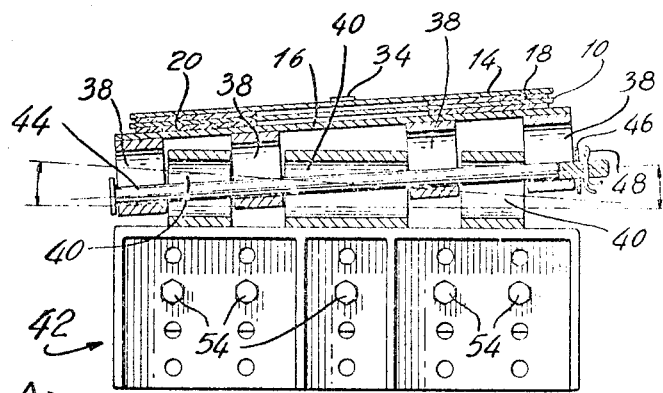
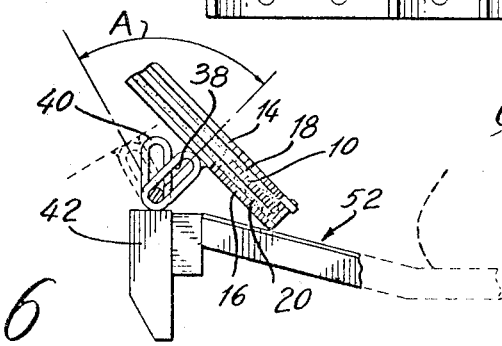
INVENTOR
Jacques PONTBRIAND
ATTORNEY 000
United States Patent Office 3,519,287
Patented July 7, 1970

3,519,287
TRAILER STABILIZER
Jacques Pontbriand, 70 Avenue des Pins,
Rawdon, Quebec, Canada
Filed Dec. 23, 1968, Ser. No. 785,893
Int. Cl. B60d 1/00
U.S. Cl. 280—446                                  5 Claims

ABSTRACT OF THE DISCLOSURE

A connection between a tow car and a trailer comprising a connecting plate fastened to the trailer and sandwiched under resilient pressure between two friction plates which are adapted to rotate in unison relative to the connecting plate. The friction plates are connected to the tow car by a hinge whose apertures are vertically elongated to permit a transverse vertical play.

---

The present invention relates to a trailer stabilizing device and in particular to a connection between the trailer and a towing vehicle for preventing the sway of the trailer when the towing vehicle and trailer move in a curved path.

Various embodiments are known for restricting the sway of a trailer which is pulled by a towing vehicle. Many of the known stabilizers require a complex structure in order to achieve the desired results.

It is an object of the present invention to provide a trailer stabilizing connection which requires a simple structure and an easy maintenance while being reliable and economical.

Another advantage of the present stabilizer consists in providing a strong resistance to the sway by a simple mechanism which may easily be mounted.

Furthermore, the present invention permits a relative transverse tilting of the car relative to the trailer, the said tilting generally being caused by uneven surfaces of the road.

The trailer stabilizer according to the present invention is adapted to be mounted between a trailer and a tow car and comprises a connecting plate to be fastened to said trailer, a pair of pressure plates mounted over both surfaces of the connecting plate and resiliently pressed thereto, the said pressure plates being secured to one another to rotate in unison, the rotation taking place about a shaft common to all the plates, hinge means connecting one of said pressure plates to the tow car about an axis transverse to said car and said trailer for allowing a pivoting action of the car and the trailer relative to said transverse axis, whereby the sway imparted to the trailer when the tow car moves on a curved path, is substantially reduced by friction between the connecting plate and the pressure plates.

In addition, the hinge means is particularly designed so as to permit a tilt of the trailer relative to the car along a transverse axis.

In the drawings which illustrate an embodiment of the invention,

FIG. 4 is an exploded view of the stabilizer;

FIG. 5 is a cross-sectional view taken along a vertical plane crossing the hinge and illustrating the tilting of the two parts thereof; and FIG. 6 is a side view of the stabilizer which is pivoted about the hinge to show the possible relative angle between the car and the trailer.

Figure 1:
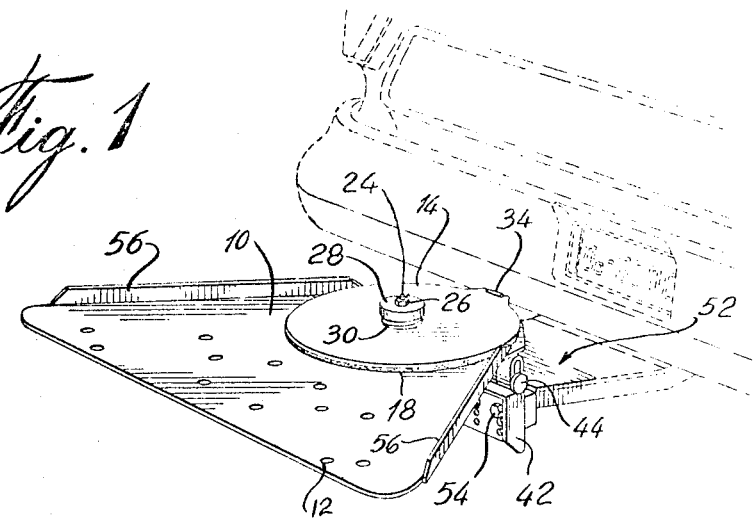
FIG. 1 illustrates a perspective view of the trailer stabilizer connected on a car.

The trailer stabilizing connection includes a triangular connecting plate 10 which comprises a certain number of perforations 12 adapted for an appropriate bolting to the front end of the frame of the trailer. The connecting plate 10 is sandwiched between two pressure plates 14 and 16 and the friction rings 18 and 20 are inserted between the connecting plate and the pressure plates 14 and 16. These friction rings 18 and 20 are made of any material which increases the resistance to rotation between the connecting plate 10 and the pressure plates 14 and 16. According to the preferred embodiment illustrated, the friction rings 18 and 20 are secured to the connecting plate 10 by rivets 22.

The connecting plate 10 and the pressure plates 14 and 16 are resiliently secured together by a bolt 24 welded to the lower plate 16 and tightened at the other end by a nut 26 which compresses a washer 28 and a coil spring 30 around the bolt 24 so as to provide a predetermined compression between the plates. Although the purpose of the friction rings 18 and 20 is to hinder the relative rotation of the pressure plates and the connecting plate, it is nevertheless desired to obtain the relative rotation between these plates and therefore the effect of the coil spring will be to limit the tightness between the plates. At the end of the bolt 26, a cutter pin 32 is introduced for added security so as to prevent the unfastening of the bolt 26.

In order to lock the relative rotation between the two pressure plates 14 and 16, the lower plate 16 is provided with a peripheral retaining lug 34 directed upwardly and the upper plate 14 is provided with a notch 36 about its periphery and is positioned so that it will engage the lug 34. This arrangement, while permitting the two pressure plates to rotate in unison, will also permit the said plates to vary their spacing in parallel relationship. It is obvious that if the two plates would be solidly fixed together at one point about the periphrey thereof, the parallel relationship would be broken when the thickness of the connecting plate 10 and/or the friction rings 18 and 20 would be changed.

The car and the trailer do not always travel on an even and identical plane. Consequently the connection between the two vehicles must include a pivoting movement about a transverse and a longitudinal axis. These desired movements may be obtained with a hinge having elongated vertical apertures. The bottom pressure plate 16 is provided with a set of adjacent slots 38 and a plate 42 is provided with a corresponding set of elongated slots 40 to be located between the above-mentioned slots 38 so as to form a hinge. A hinge pin 44 having a cylindrical section passes through all the slots 38 and 40 and is retained therethrough by a washer 46 and a cutter pin 48.

The plate 42 is provided with a plurality of rows of holes 50 which facilitate its connection to the mounting frame 52 solidly fixed to the chassis of the car. A set of bolts 54 is used for connecting the plate 42 to the mounting frame 52.

This type of hinge will enable the car and the trailer to move on hilly roads without causing any hindrance to their relative movements. As illustrated in FIG. 6, an angle A may exist between the car and the trailer.

The fact that the hinge is provided with elongated slots 38 and 40 and a cylindrical pin 44 enables the trailer to tilt sideways relative to the tow car as shown in FIG. 5. This freedom is particularly useful when the road is bumpy or uneven across its width.

Figure 2:
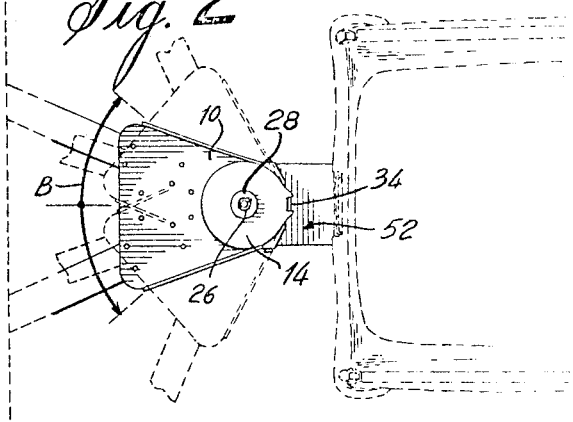
FIG. 2 is a top plan view of the stabilizer mounted between a car and a trailer.
Figure 3:
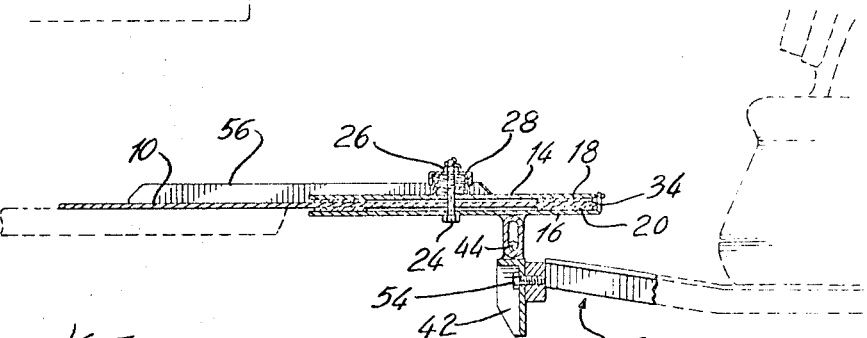
FIG. 3 is a cross-sectional view of the stabilizer taken along a central vertical plane.

When the car moves on a curved path, the stabilizer connection will pivot about the bolt 24 as indicated by the angle B in FIG. 2. However, as it is well known, the centrifugal force acting on the trailer will cause a sway of the trailer on the outside of the curved path and quite often beyond the control of the car driven. Thi sway may cause an accident if the trailer happens to hit an object on the side of the road or a car coming from the opposite direction. The sway is also noticable and very annoying when a car driver pulling a trailer wants to pass another car and needs to get in line quickly after it has passed said other car. The sway of the trailer in said latter case may pull the trailer to quickly in the path of the following car and a collision may occur. The friction means located above the pivoting axis represented by the bolt 24 will restrict the amount of sway, will provide a better control for the car driver and reduce the possibilities of an accident. The connecting plate 10 which is hooked to the front frame of the trailer will rotate between the two pressure plates 14 and 16 with reluctance and therefore will prevent the swift sideways movement of the trailer. Although plate 10 has mainly lateral stresses, two flanges 56 are welded along the lateral sides of the plate 10. When the car returns to a straight path, the weight of the trailer pulls on the stabilizer connection so as to return it to its original position.

This type of stabilizer also enables the use of a simple hinge connection which facilitates the pivoting action along orthogonal directions.

The plates used for this new connection are preferably made of steel and the gauge will correspond to the weight of the trailer to be pulled.

I claim:

1. A trailer stabilized adapted to be mounted between a trailer and a tow car, comprising:
    a connecting plate to be fastened to said trailers;
    a pair of pressure plates mounted over both surfaces of the connecting plate,
    friction means between the said pressure plates and said connecting plate,
    a coupling pin mounted through said plates, the towing force for pulling the trailer being exerted upon said pin, said pin constituting a pivot axis about which said pressure plates rotate in unison relative to the connecting plate to suppress undesired sway,
    hinge means for connecting one of said pressure plates to the tow car about an axis transverse said car and trailer for allowing a pivoting action of the car and the trailer relative to said transverse axis,
    whereby the sway imparted to the trailer when the tow car moves on a curved path is substantially reduced by friction between the connecting plate and the pressure plate.

2. A trailer stabilizer as recited in claim 1, wherein the hinge means comprise two hinged parts having vertically elongated aperture, and a cylindrical hinged pin located through the apertures, whereby the two hinged parts have a relative vertical play to enable the trailer to tilt sideways relative to the car.

3. A trailer stabilizer as recited in claim 1, wherein the two pressure plates are secured to one another by an interlockinig notch and lug positioned about a periphery of the pressure plates, the said lug and notch being adapted to permit a variable parallel spacing between the pressure plates.

4. A trailer stabilizer as recited in claim 1, wherein the friction means comprise a pair of friction rings concentrically positioned about the said pin, and rigidly secured to the connecting plate.

5. A trailer stabilizer as recited in claim 1, wherein the means for resiliently pressing the pressure plates together comprise a coil spring axially mounted about the said pin.

References Cited

UNITED STATES PATENTS 3,400,948    9/1968    Matson _____ 280—446

FOREIGN PATENTS 648,623    8/1937    Germany.
47,654    1/1940    Netherlands.

LEO FRIAGLIA, Primary Examiner